(12) United States Patent
Bose (10) Patent No.: US 7,806,966 B2
(45) Date of Patent: Oct. 5, 2010

(54) NITROGEN INERTING SYSTEM FOR EXPLOSION PREVENTION IN AIRCRAFT FUEL TANK AND OXYGENATING SYSTEM FOR IMPROVING COMBUSTION EFFICIENCY OF AEROSPACE ROCKETS/ AIRCRAFT ENGINES

(76) Inventor: Ranendra K. Bose, 14346 Jacob La., Centreville, VA (US) 20120-3305

( * ) Notice: Subject to any disclaimer, the term of this patent is extended or adjusted under 35 U.S.C. 154(b) by 453 days.

(21) Appl. No.: 12/005,297

(22) Filed: Dec. 27, 2007

(65) Prior Publication Data
US 2009/0166358 A1 Jul. 2, 2009

(51) Int. Cl.
*B01D 50/00* (2006.01)
(52) U.S. Cl. .......................... 95/270; 55/385.3; 55/396; 55/406
(58) Field of Classification Search .................. 55/306, 55/385.3, 337, 404, 406, 409, 459.1, 482, 55/485, 317, DIG. 30, 392, 394, 396, 397, 55/398; 95/273, 232, 237, 287, 270; 96/351, 96/366; 60/279, 902
See application file for complete search history.

(56) References Cited
U.S. PATENT DOCUMENTS
3,717,006 A 2/1973 Kimmel et al.

(Continued)

FOREIGN PATENT DOCUMENTS
CA 1030777 5/1978

(Continued)

OTHER PUBLICATIONS

R.K. Bose., U.S.D.O.E. Grant Award Test Report entitled "Reliability and Life cycle Testing of the Automobile, Anti-Pollution and Energy Conservation System", Mar. 1980.

(Continued)

*Primary Examiner*—Duane Smith
*Assistant Examiner*—Minh-Chau Pham (57) ABSTRACT

Compressed Air from an aircraft/rocket engine's compressed air line to its air-conditioning system, or an Auxiliary Air Compressor out-put is used, for energizing a high-speed gas turbine. The very high-speed convoluting air discharge into a vortex cone causes a first separation of the Air gas components, by stratifying into heavier (Argon), medium (Oxygen) and lighter (Nitrogen) components, where in the heavier and lighter components are non-combustible, inert gases and the medium is a combustible gas. The lighter non-combustible component (Nitrogen) exits from the turbine in one direction for storage in the Inert gas tank. The heavier (Argon) and medium (Oxygen) components together move in the opposite direction for having a second stratifying separation downstream in the vortex tube, to separate non-combustible, heavier (Argon) gas from combustible medium (Oxygen) gas components. The combustible, medium (Oxygen) component exits the vortex tube open end, to flow into an Oxygenating storage tank; whereas, the heavier, non-combustible (Argon) gas is piped into the Inert gas storage tank. Both gas storage tank in-flow lines are fitted with non-return valves. The out flow lines from the Inert tank to either Fuel Tank "Ullage" or "OBGIS" areas are fitted with electronic control valves, operated by signals received from fiber-optic Temperature/Pressure/Oxygen concentration Sensors in the Fuel tank "Ullage" or "OBGIS: areas. Likewise, the outflow lines from the Oxygenating tank are fitted with electronc control valves activated by engine "takeoff" or Passenger cabin low oxygen signals, respectively.

15 Claims, 3 Drawing Sheets

U.S. PATENT DOCUMENTS

| | | | |
|---|---|---|---|
| 3,788,039 A | 1/1974 | Bragg | |
| 3,797,263 A | 3/1974 | Shahir et al. | |
| 3,838,576 A | 10/1974 | Geffs | |
| 3,861,142 A | 1/1975 | Bose | |
| 3,892,070 A | 7/1975 | Bose | |
| 4,011,734 A | 3/1977 | Jones | |
| 4,235,845 A | 11/1980 | Bose | |
| 4,399,107 A | 8/1983 | Bose | |
| 4,566,282 A | 1/1986 | Knoblauch et al. | |
| 5,120,972 A | 6/1992 | Rangwalla et al. | |
| 5,273,344 A | 12/1993 | Volkwein et al. | |
| 5,794,408 A | 8/1998 | Patouraux et al. | |
| 6,098,674 A | 8/2000 | Germain et al. | |
| 6,182,715 B1 | 2/2001 | Ziegler et al. | |
| 6,215,027 B1 | 4/2001 | Papavassiliou et al. | |
| 6,234,380 B1 | 5/2001 | Heine | |
| 6,360,730 B1 | 3/2002 | Koethe | |
| 6,379,827 B1 | 4/2002 | Cipollini | |
| 6,398,104 B2 | 6/2002 | Heine | |
| 6,398,851 B1 * | 6/2002 | Bose | 95/273 |
| 6,634,598 B2 | 10/2003 | Susko | |
| 6,843,269 B2 | 1/2005 | Verma et al. | |
| 7,081,153 B2 | 7/2006 | Leigh et al. | |
| 7,108,047 B2 | 9/2006 | Marti et al. | |
| 7,591,866 B2 * | 9/2009 | Bose | 55/337 |
| 7,704,291 B2 * | 4/2010 | Bose | 55/337 |

FOREIGN PATENT DOCUMENTS

| | | |
|---|---|---|
| CA | 1104060 | 6/1981 |

OTHER PUBLICATIONS

Air Safety Week, vol. 15 No.16, Apr. 16, 2002, entitled "Fatal Explosion Highlights Hazards of Flammable Vapors in Fuel Tanks".

* cited by examiner

NITROGEN INERTING SYSTEM FOR EXPLOSION PREVENTION IN AIRCRAFT FUEL TANK AND OXYGENATING SYSTEM FOR IMPROVING COMBUSTION EFFICIENCY OF AEROSPACE ROCKETS/AIRCRAFT ENGINES

CROSS-REFERENCES TO RELATED APPLICATIONS

This Invention is an improvement over the system shown in my prior U.S. Pat. Nos. 6,398,851B1 issued Jun. 4, 2002; U.S. Pat. No. 4,399,107 issued Aug. 16, 1983; U.S. Pat. No. 4,235,845 issued Nov. 25, 1980; U.S. Pat. No. 3,892,070 issued Jul. 1, 1975; U.S. Pat. No. 3,861,142 issued Jan. 21, 1975 and Canadian Patent Nos: 1,104,060 issued Jun. 30, 1981; 1,030,777 issued May 5, 1978. All USA and Canadian patents are incorporated by reference herein, the present disclosures being based primarily on these, which are repeated herein.

FEDERALLY SPONSORED RELIABILITY AND LIFECYCLE TESTS

My patented, "Anti-Pollution System For Automobiles", Experimental Prototype herein after referred to as the Bose System, was based on U.S. Pat. Nos. 4,235,845; 3,892,070 and 3,861,142. This System received an US D.O.E Grant Award from its Office of Energy Related Inventions. The Grant was used to demonstrate the Bose System's pollutant gas separation and emission control efficiencies along with the fuel economy achieved, as compared with the OEM Catalytic Converter, as a retrofit application on a new 1979 Model Chrysler Cordoba V8, 5.9 Liter engine capacity test automobile. After completion of the baseline, dynamometer powered tests with the OEM converter at 1,134 and 12,140 service miles, the three-way converter was removed and replaced with the Bose System prototype, leaving all other OEM pollution accessories in place, including the controlled electronic ignition combustion and the exhaust gas re-circulation systems. Eight dynamometer test results, using the 1975 CVSII Federal Test Procedure (FTP), were used to verify the repeatability and lifecycle of the Bose System over 50,000 service-test miles. All tests were performed at the Gulf Research Laboratory, Pittsburgh, Pa. The comparative test results submitted in US DOE Report, "Reliability & Lifecycle Testing of the Automobile, Anti-Air Pollution & Energy Conservation System", March 1980, are referenced in U.S. Pat. No. 6,398,851 & are summarized as follows:—

(A) A lifecycle pollutant emissions study based on these test data has estimated that the lifecycle pollutant emissions for the catalytic converter was 2,621,488 grams as compared to the Bose System's emissions of 900,000 grams. (B) The Bose System's fuel economy based on the converter's fuel consumption was 6.7% in city driving and 19% in High way driving conditions. (C) Special Test #4 dedicated to the measurement of Bose System Centrifugal Pollutant Gas Separation efficiency was 75.5% for Hydro carbons (HC), 71.8% for Carbon Monoxide (CO), 68.8% for Nitrogen Oxide (NOx). See Table below:—

BOSE SYSTEM'S POLLUTANT GAS SEPARATION EFFICIENCY:
(PROPRIETARY TEST DATA: GULF RESEARCH LABORATORY)

1. TAILPIPE EXHAUST GAS EMISSION ANALYSIS:

| Dynamometer Test | | Tailpipe Gas Analysis (as recorded: using 45% air dilution) | | | Tailpipe Gas Analysis (undiluted estimate of gas concentration) | | |
|---|---|---|---|---|---|---|---|
| Description (see Test #4, Final Report) | Sample Bag # | HC (ppm) | CO (%) | $NO_x$ (ppm) | HC (ppm) | CO (%) | $NO_x$ (ppm) |
| Cold Transient Run | 1 | 284.3 | 0.252 | 44.0 | 412.24 | 0.365 | 63.8 |
| Stabilized Run | 2 | 94.93 | 0.018 | 46.87 | 166.13 | 0.0315 | 82.0 |
| Hot Transient Run | 3 | 126.89 | 0.045 | 71.73 | 184.0 | 0.065 | 104.0 |
| 1(a) Average Tailpipe Emissions (3 Bags) | | 168.7 | 0.105 | 54.2 | 254.14 | 0.154 | 83.26 |

2. EMISSION ANALYSIS OF POLLUTANT GAS SEPARATED IN BOSE SYSTEM:

| Separated gas concentrations | | Pollutant Gases Separated (undiluted) | | |
|---|---|---|---|---|
| recorded in Table III: at sample points | Type of Gases Separated | HC (ppm) | CO (%) | $NO_x$ (ppm) |
| Tee-Joint 'B' | Lighter - HC & CO, NO | 697.85 | 0.343 | 284.0 |
| Tee-Joint 'C' | Heavier - HC, $NO_x$ | 876.0 | 0.445 | 81.99 |
| 2(a) Average concentration of separated gases | | 787.0 | 0.394 | 183.0 |

-continued

BOSE SYSTEM'S POLLUTANT GAS SEPARATION EFFICIENCY:
(PROPRIETARY TEST DATA: GULF RESEARCH LABORATORY)

3. TOTAL ESTIMATED AUTO EXHAUST EMISSION RECORDED
IN TEST #4
(subtotal of lines 1(a) and 2(a) above tabulation):

| Total estimated exhaust emissions | HC (ppm) | CO (%) | $NO_x$ (ppm) |
|---|---|---|---|
| 3(a) Subtotal of lines 1(a) and 2(a) | 1041.14 | 0.548 | 266.0 |

4. BOSE SYSTEM'S POLLUTANT GAS SEPARATION EFFICIENCY (%):

| Gas separation efficiency | HC (%) | CO (%) | $NO_x$ (%) |
|---|---|---|---|
| Line 2(a) ÷ Line 3(a) | 75.5 | 71.8 | 68.8 |

TABLE III

SEPARATED EXHAUST GAS CONCENTRATIONS
Hydrocarbons, Carbon Monoxide, Nitric Oxides, and Aldehydes
Determined at Three Sampling Locations During Test No. 4
(Sample Points as Designated By Mr. R. K. Bose in the Control System)

| | Designated Sample Point | | |
|---|---|---|---|
| | Point A | Point B | Point C |
| Sample Volume, Cubic Ft. | 0.66 | 0.55 | 0.60 |
| Moles Carbonyl | 0.00175 | 0.00329 | 0.00470 |
| Carbonyls, Mg/Cubic Ft. | 80 | 180 | 224 |
| Carbon Monoxide, % | 0.148 | 0.343 | 0.445 |
| Carbon Dioxide, % | 2.05 | 10.17 | 11.66 |
| Hydrocarbons, PPM | 257.26 | 697.85 | 876.02 |
| $NO_x$, PPM | 80.23 | 284.03 | 81.99 |

Figure 1:
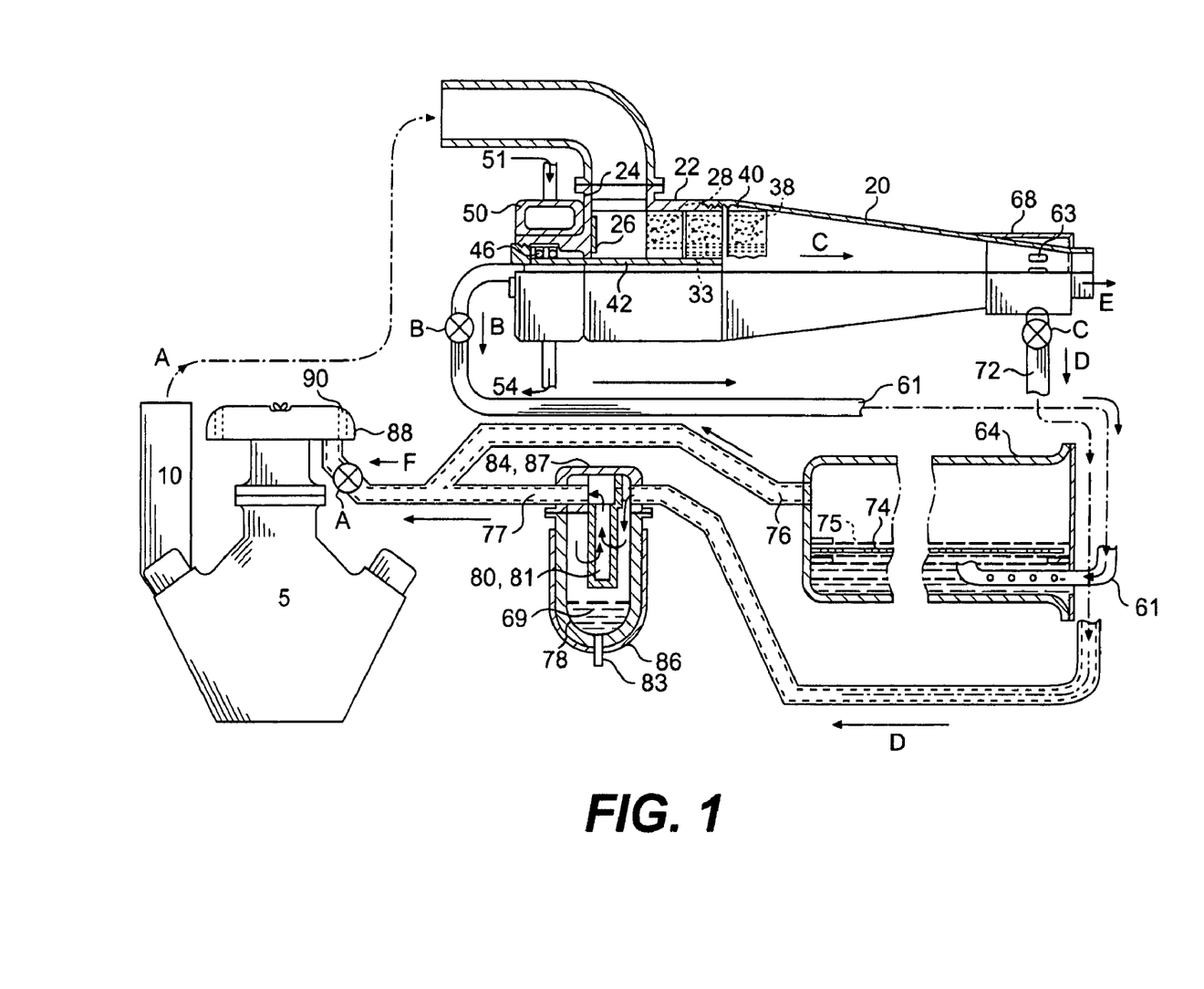
FIG. 1(B) diagram illustrates the Inerting System, its main components as installed on the floor of the Air Conditioning System compartment (Item 6) in the body of an airplane.

Note:
For Sampling Locations: A, B and C, See FIG. 1 (excerpt from U.S. Pat. No. 6,398,851)

BACKGROUND OF INVENTION

The present Invention relates generally to a significant method for the centrifugal separation of the Nitrogen ($N_2$) component of compressed air, diverted from an airplane's Air Conditioning Intake pipeline, from its other two components Oxygen ($O_2$) and Argon (A), based on the teachings of my prior U.S. Pat. No. 6,398,851 B1, et al. The objective of this improved technology being to divert the separated Nitrogen ($N_2$) and Argon (A) gas streams, which are both Inerting gases, to the "ullage", (that is, the over-fuel) volume of the aircraft fuel tanks, for preventing tank explosions; alternatively, using this Inert Gas to fight Cargo Fires or meet other "On Board Inert Gas" (OBIGS) requirements, such as Fuselage Protection from enemy bullets in military aircraft. On the other hand, the Oxygen ($O_2$) separated component is introduced to the aircraft's engine or aerospace rocket's combustion air supply, for improving their combustion efficiency. Alternatively, the Oxygen component may also be diverted to the Air Conditioning Intake piping, for re-freshening the aircraft cabin space, for enhanced passenger breathing comfort.

FIELD OF THE INVENTION

Historically, over the last half-century, there have been a number of explosions of the Center Wing Tank on military and commercial aircraft, resulting in the deaths of 550 persons.

These continuing fuel tank explosions have been reported to be caused by unknown ignition sources, possibly by heat-conductive wires exposed to the explosive fuel vapor/air mixture created in the tank's "ullage", with the progressive consumption of the fuel during the aircraft's flight/take-off waiting time. Yet another cause of these explosions, predominantly occurring on the Center Wing Tank in commercial aircraft, has been identified to be the propensity of these tanks getting over-heated when the aircraft is subjected to long "take-off" queues, on the airport's hot tarmac in summer. Reference: Air Safety Week, Vol. 15 No: 16, Apr. 16, 2002, "Fatal Explosion Highlights Hazard of Flammable Vapors in Fuel Tanks".

Aircraft fuel tank ullage comprises a combustible combination of oxygen from air leakage into the tank ullage and hydrocarbon fuel vapors created with increasing ullage, as fuel consumption progresses. This gas mixture can be explosive at a low combination of the tank's internal temperature, pressure and fuel characteristic, which is called it's "Flash Point". Industry literature, however, suggests that a "Limiting Oxygen Content"~ (LOC) prevents a fuel tank explosion, regardless of the Flash Point factors. Thus, the current standards specify that the minimum amount of oxygen needed to sustain combustion at sea level is 12%, increasing to 14.5% at 30,000 feet above sea level. Reference: "FAA 'Breakthrough': Onboard Inerting", Aviation Week & Space Technology, Croft, John, Jan. 6, 2003.

DESCRIPTION OF THE RELATED ART~37 CFR 1.97 AND 1.98

Prevention of these tank explosions initially led to development of Inerting Systems using halogen-based gases. However, these Systems have been now discarded because the release of used-up halogens results in ozone depletion in the atmosphere, causing Global Warming. Thus, the subsequent Inerting Systems developed, have generally used Liquid Nitrogen, externally procured and replenished periodically to the aircraft in thermally insulated containers, (called dewars). Examples cited are: U.S. Pat. Nos. 3,717,006; 3,788,039; 3,797,263; 3,858,576; 4,011,734; 5,120,972; 5,273,344; 5,794,408; 6,098,674; 6,182,715B1; 6,215,027B1; 6,234,380B1; 6,360,730B1; 6,398,104B2; 6,634,598B2; 7,108,047B2.

However, U.S. Patent application Ser. No: 20020162915 A1 to Mitani claims an environmental unit for an airplane, wherein air of high-temperature & high pressure is extracted from an engine or an auxiliary power portion of an airplane. This extracted air is further regulated in temperature and pressure by an air conditioning portion and then supplied to a pressurized chamber, where the air exhausted from the pressurized chamber or air drawn out of the pressurized chamber is separated into air enriched with nitrogen and air enriched with oxygen. The air enriched with oxygen is returned to the pressurized chamber for further enrichment. The air enriched with nitrogen is introduced into the ullage of the airplane fuel tank. The air enriched with oxygen is, once again diverted to the pressurized chamber by making use of the circulation line of the auxiliary air condition portion. Similar Inerting gas mixtures have been produced by air permeation process, by passing pressurized air through fine porous, membrane/electrode assembly (MEA). Examples cited are: U.S. Pat. Nos. 6,281,464B1; 6,379,827B1. Similar Inerting gas mixtures have also, been produced but using molecular sieves, which either selectively adsorbs oxygen from the ullage gas to provide an oxygen-depleted return ullage gas; or selectively adsorbs nitrogen from the ullage gas, which nitrogen is desorbed and conveyed to a purge gas, to provide a nitrogen-enriched gas. The return gas or the nitrogen-enriched gas is flowed to the ullage, to render it non-explosive: Examples cited are: U.S. Pat. Nos: 4,566,282; 6,843,269B2; and 7,081, 153B2

Thus, the prior art inerting systems are complicated, energy-intensive and have drawbacks, including costly operational components, that require large space and weight allowances which in turn, results in the sacrifice of the airplane's improvements in overall system design. Additionally, repetitive airflows into and from the air conditioner components result in operational inefficiencies, which again increases the overall cost of manufacture, reliability and operation of such Inerting Systems.

BRIEF SUMMARY OF INVENTION

Where as, the comparatively in-expensive, light-weight Bose System's Improved centrifugal gas separation technology could be used simply, by tapping the Aircraft engine's compressed air line to the Air Conditioning System, or alternatively, using an Auxiliary, electrically-operated Air Compressor, in order to drive the free-wheeling gas turbine at a very high speed. Thus, the expanding compressed air exiting from the gas turbine blades, creates a high-speed, convoluting gas mass which further increases its rotational speed as it flows through the adjoining Vortex cone of the Bose System. See FIG. 1(B). Since the Bose System will be dealing with three gas constituents of differing molecular weights in Atmospheric air, namely Nitrogen ($N_2$) of molecular weight=28, Oxygen ($O_2$) of molecular weight=32 and Argon (A) of molecular weight=38, there will be a 3-way stratification of the convoluting air mass, in accordance to their differing molecular weights, as they escape from the last set of stator blades.

Thus, the lightest constituent Nitrogen ($N_2$) of molecular weight 28, will be convoluting as the first strata at the core of the spinning air mass. This gas core gets pressured out through the Bose System's turbine hollow shaft as flow stream "B". See FIG. 1(B). The second middle strata comprises the heavier constituents Oxygen ($O_2$) having molecular weight of 32. This middle strata of convoluting gas is discharged under its own pressure, through the open end of the vortex cone, as flow stream "E". Where as, the third, outer-most strata comprises the heaviest of the constituent gases, namely Argon (A) of molecular weight of 38. This gas gets pressured out through slots provided at the small end of the vortex cone, into a gas chamber for onward Collection and usage under its own pressure, as flow stream "D". See FIG. 1(B). Dependent upon the mass and pressure of the Compressed Air Intake into the Bose Turbine System and its resultant rotary speed (r.p.m), this Invention is able to centrifugally separate with 95% purity, each of its constituent gases, namely Nitrogen, Oxygen & Argon.

Among the several Objects and Advantages of the present invention may be noted:

the prevention of airplane and other hydrocarbon fuel tank/containers' explosion by inerting their "ullage" space, with Nitrogen ($N_2$) and Argon (A) gas, centrifugally separated from the air at high-temperature & high pressure, extracted from an engine or an auxiliary power portion of an airplane;

the extinguishing of the airplane's cargo and other "OBGIS" fires, by providing means to spray this separated Nitrogen and Argon gases on to the fires;

the economical improvement of the aircraft's/rocket engine's fuel combustion efficiency, by the introduction of the Oxygen ($O_2$) gas separated component to the aircraft's engine or aerospace rocket's combustion air supply;

the economical re-freshening of the aircraft cabin space, for enhanced passenger breathing comfort, by the introduction of the Oxygen ($O_2$) gas separated component diverted to the Air Conditioning Intake piping In accordance with the teachings of the present invention, it has been found that the foregoing Objects and their attendant Advantages can be realized with a conventional airplane jet or other engine, by providing an anti-air pollution and energy conservation device having no moving parts and which, when connected to the an airplane's compressed Air Intake pipeline for Air Conditioning or other Air Compressor power, through an electronically operated three-way valve: V.1., operates automatically to substantially separate the lighter (Inert: $N_2$) gas and medium(Combustible: $O_2$) gas from the heavier (Inert: A) gas component of the compressed air supply. The Inert and Combustible gases may then be selectively stored and distributed to the Ullage and the "OBGIS" requirement areas, or Engine combustion air supply lines, respectively.

Since the teachings of the present invention requires the availability of adequate mass of compressed air at sufficient pressure and temperature, to run the anti-air pollution and energy conservation system's turbine, at a very high rotary speed, it may necessitate the retrofit of an electrically driven, variable flow, adjustable discharge pressure Gas Compressor(s) of either centrifugal or rotary screw type or any other type, with each device or a plurality of devices, as may be required to fully energize these devices;

This device simply comprises an elongate converging, vortex tube which terminates in a small discharge outlet at one end and fitted with a down-steam stator wheel, at its large junction end with the cylindrical housing of the turbine impeller and immediately adjacent to the impeller. A suitable support for the impeller is provided on a hollow axial rotary shaft, extending up to the large end of the vortex tube and exteriorly of the cylindrical housing carried on high temperature/high speed ball bearings, or magnetic bearings or air bearings, within the cylindrical housing, the outer end of which is fashioned into an annular chamber for the circulation of the bearing's cooling water from the aircraft engine cooling or other systems. An upstream stator wheel is mounted to the inside of the cylindrical housing of the turbine impeller and immediately ahead of it. An inlet pipe is arranged and disposed near the closed, wall end of the cylindrical turbine housing for the compressed air from the aircraft's Air Conditioning Intake line or output of the Auxiliary air compressor, to be injected tangentially, or peripherally therein.

As the pressurized air from the aircraft's Air Conditioning Intake is introduced through the inlet pipe of the device, it is directed through the upstream stator wheel for reducing the gas turbulence before its impact on the turbine impeller blades. The expansion of the gas through the turbine blades causes the turbine to speedup to the critical high-speed of rotation, required for centrifugal gas separation, at which speed as the exhaust gas mass passes there through into the downstream stator wheel and into the conical vortex tube, the convoluting gas mass is centrifugally stratified into three layers, in accordance with their molecular weights:

The inner core comprises of the lighter, incombustible Nitrogen ($N_2$)gases of molecular wt=28, which are fed back through the hollow shaft of the gas turbine, as Flow stream "B"/"F", to the Inert storage Tank: T1, through non-return valve: V2 for later distribution to the "Ullage" in the Fuel tank: T2, as Flow stream "H" via control valve: V3, and/or the "OBGIS" areas, as Flow stream "G" via control valve: V4. The control valve: V3 is activated electronically by Fibre-optic Oxygen and Temperature Sensors: S.1 and S.2 installed in the ullage space of the Fuel Tank: T.2. The control valve: V4 is activated electronically by the Fire Alarm Sensors in the Cargo/OBGIS areas: See FIG. 1(B); the middle layer comprises Oxygen ($O_2$) gases of molecular wt=32, which are piped out through the small end of vortex tube, as Flow stream "E", into the Oxygen storage Tank: T.3, through non-return valve: V5 for later distribution to the aircraft/rocket engine's combustion air supply, as Flow stream "J" via control valve: V6 or the Air Conditioning Intake line, as Flow stream "I" via control valve: V7. These control valves are activated electronically by the Engine Start-up Sensor. Where as, the outermost layer comprises the heavier incombustible Argon (A) gases~mol wt=38, which are separated through the elongated, radial slots milled at the smaller end of the vortex tube and collected in the second separation stage chamber.—Item 68, and subsequently piped to the Inert gas storage Tank: T.1 for later distribution with Nitrogen, as Flow stream "D"/"F", via non-return valve: V2: See FIG. 1(B).

BRIEF DESCRIPTION OF THE DRAWINGS

The present invention is shown in the accompanying drawings wherein.

DETAILED DESCRIPTION OF THE INVENTION

Figure 1B:
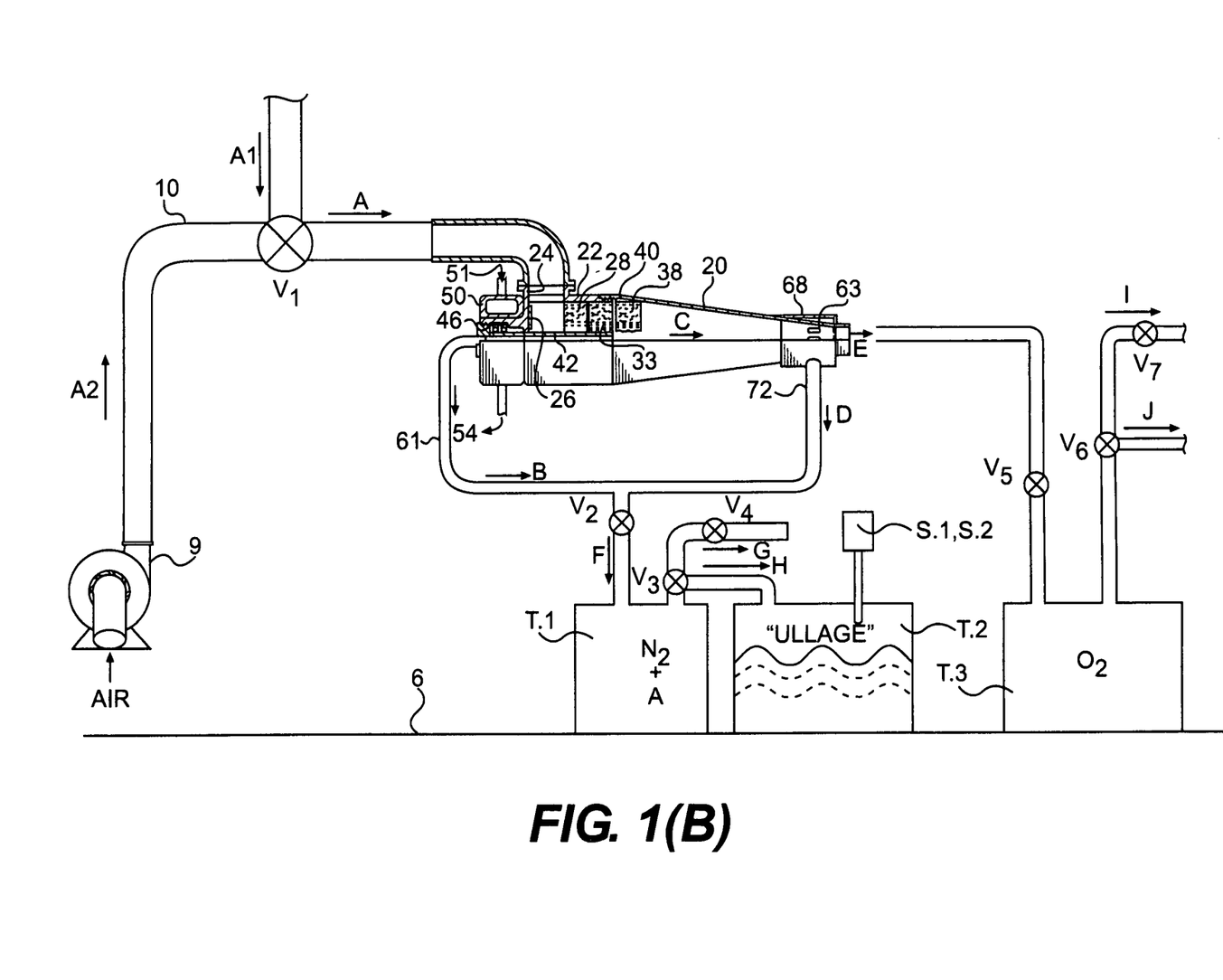

The present invention of a Nitrogen Inerting System that may be used on airplane's and other hydrocarbon fuel tanks and similar Applications required in Anaerobic Digesters in the biomass gas recovery and other processes, or similar Oxygenating Applications as required in Coal-Power Plants, Steel Plant Blast Furnaces for energy efficiency, NOx gas prevention, $CO_2$ recovery from their exhaust & other industrial processes, is illustrated in FIG. 1(B) of the drawings. The alphabetical reference characters A-J designate the gases/gas mixtures as follows:

| Arrow | Gases |
|---|---|
| A: | Compressed Air from Airplane air conditioning intake line (A1) or Auxiliary Air Compressor (A2) feeds to rotate the turbine impeller at very high speed |
| B: | Lighter inner core of gases comprising primarily inert gas: nitrogen, are fed into the Inert gas tank for storage |
| C: | Heavier of the heavy outer layer of gas mixture of non-combustible gases, such as, Argon, and the lighter of the heavier and combustible gases, such as, oxygen. |
| D: | Substantially, the heavier of the heavy gases, as above, namely the Inert Argon gas. |
| E: | Substantially, the lighter of the heavier gases, such as oxygen. |
| F: | The combined flow of nitrogen and argon into the Storage Tank: T.1 |
| G: | The controlled flow of nitrogen and argon gases to the "OBGIS" area. |
| H: | The controlled flow of nitrogen and argon gases to the Fuel Tank: T.2 ~"Ullage" |
| I: | The controlled flow of oxygen in to the airplane's air conditioning intake line. |
| J: | The controlled flow of oxygen in to the airplane engine's combustion air-intake line |

FIG. 1(B) of the drawing shows the use of Compressed air diverted from the Aircraft engine's compressed air line to the AirConditioning System(A1), alternatively, using the output of an Auxiliary electrically-operated Air Compressor 9 (A2), via their discharge pipe 10 to the inlet at the larger end of the vortex tube 20, there being a cylindrical housing 22 to which the vortex tube connects, and having entry port 24 connecting to pipe 10. Within such housing is a heat shield 26 and stator wheel 28 secured upstream of turbine impeller wheel 33, downstream of which is a further stator wheel 38 located at the larger end of the vortex tube and secured by welding at 40.

A suitable support for the impeller is provided on a hollow steel axial rotary shaft 42 extending up to the large end of the vortex tube and exteriorly of the cylindrical housing carried on a pair of high temperature/high speed, steel ball bearings, (alternatively an air bearing or magnetic bearing may be used, if higher turbine rotary speed is required and a higher cost is permissible) 46, within the cylindrical housing of the outer end of which is fashioned into a hub from which radially extends the engine radiator-water cooled Housing 50, water pipes 51,54.

The cylindrical housing may, as shown, be a single integral aluminum casting along with the exhaust gas inlet port 24. The stator wheel 38 can be fixed inside the front end of vortex tube in any obvious manner, as by welding, shrink or force fitting, spline-ing.

It will be apparent from the above description that compressed air from pipe 10 in the direction of Arrow A, enters stator wheel 28 where they are deflected to smoothly pass through to the impeller 33 effecting rotation of the impeller carried on the bearings 46 via shaft 42. In this instance, the air enters into the impeller and emerges from the stator 38 spinning in a direction to centrifugally stratify in the vortex tube 20. Thus, the core comprising of the lighter component of air passes reversely through the hollow shaft 42, in the direction Arrow B, through pipe 61 and introduced into the Inert gas storage TankT.1, via non-return valve: V2.This effects the First Separation Stage of the Inerting/Oxygenating process.

However, the mixture of heavier gases moves in the direction of Arrow C and, still rotating upon reaching the outer smaller end of the vortex tube 20, the heaviest incombustible gases, comprising the Argon gas constituent of air emerge through the ports 63 into the Second Separation Stage chamber 68 and then via pipe 72, flows in the direction of Arrow D for storage into the Inert gas storage TankT.1, via non-return valve: V2. The lighter of the heavier gases (Oxygen), which is a promoter of combustion, flows out under its own pressure, for storage in the Oxygenating storage Tank: T.3, via non-return valve: V5. See Arrow E.

Referring back to the stator 28, the placement of such a stator before a turbine impeller is of conventional practice. However, the placement of the stator 38 down stream of the impeller 33, while of apparent conventional practice, is by no means for conventional effect found in gas turbines. Experimentation and testing brought to light the puzzling effect that the lighter gases through the pipe 61 were being slowed up for some reason or other at an engine speed of about 1300 rpm. in at least two different test automobiles. It was ultimately discovered that the rotating gas mass leaving the turbine impeller blades was spinning in a direction opposite to the rotational direction of the impeller. It was further found that such opposite directional rotation was slowing down the lighter incombustible (nitrogen) gas passing through pipe 61. Accordingly, in order to prevent such opposite rotation of a gas leaving the turbine impeller, the stator 38 was added in order to redirect such gas mixture in to the same rotational direction as the impeller. The result produced was that the passage of gas mixture in the core of the whirling mass in the vortex tube faced lesser flow resistance in passing through the sleeve 42. Thus, the slow-down of gas flow in pipe 61 was alleviated.

A further beneficial effect was found in the addition of the stator 38, in that it improved the separation quantity of the lighter gas mixture passing from the vortex tube through the hollow shaft 42 and likewise increased the quantity of heavier gas mixture passing toward the second separation stage 68. This is attributed to the increased conversion of exhaust gas pressure energy into higher velocity energy effected by the presence of the stator 38. Thus, an overall improved separation effect was noted.

While still on the subject of the turbine, it has been found that providing sixteen blades on the impeller considerably enhanced the rotational speed of the gases passing there through. Also, by virtue of the stator 38 which prevented the opposite rotation of such gases with regard to the turbine impeller, the greater rotational speed produced a stronger centrifugal separating effect between the heavier and lighter gas components.

Based upon this knowledge, the present invention will develop matching gas turbine cross-sections with 16 to 24-blade design, to suit the respective high-speed, centrifugal separation requirements of Oxygen, Nitrogen and Argon constituents from atmospheric air Although U.S. Pat. Nos. 4,399,107 and 4,235,845 had used air-fins (Item. 50, FIG. 1) for cooling the high-temperature ball bearings of the turbine's hollow shaft, it was found that air cooling was insufficient to prevent relative expansion of the steel hollow shaft within its ball bearing sleeves, thereby changing its operating clearances. This change in assembly clearance caused the turbine to slow down at peak exhaust gas flow, reducing the system's gas separation efficiency. Also, it caused the ball bearing to "seize up" after 1,000 hours of service. In order to guarantee 3,000 hours of service life for this invention, an improved engine radiator, water cooled housing has also been included in the present invention (See FIG. 1, Item 50). Additionally, the impeller & stator wheels are of the shrouded type, as used in prototype experiment & testing: ref U.S. Pat. No. 6,398,851.

Figure 2A:
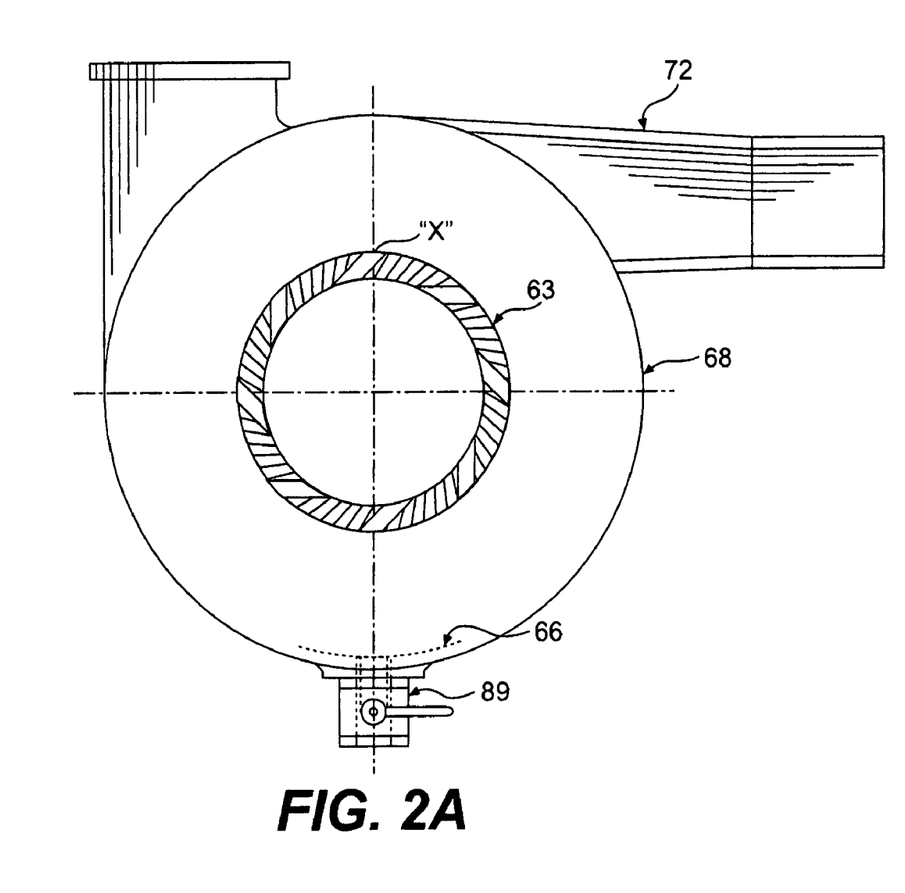
FIG. 2(A) is the cross-sectional end view of the Second Separation Chamber of the System's conical vortex tube located at its smaller end.
Figure 2B:
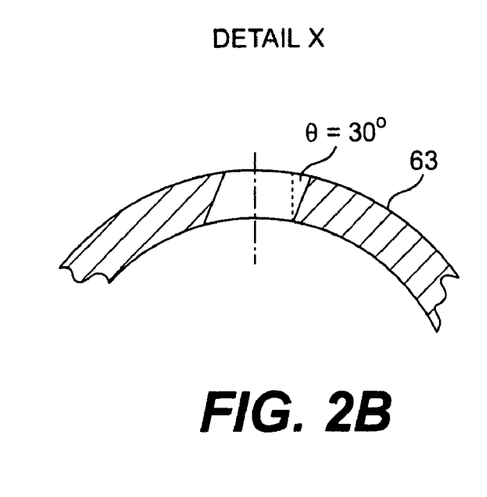
FIG. 2(B): is the cross-sectional detail of the vortex tube small end, radial slots.

Additionally, it was discovered that changing the location of the delivery pipe (Item 72) to a tangential position on the periphery of the second separation chamber (Item 68) and conforming with the rotational direction of the convoluting exhaust gas mass, further raised the separation efficiency of the heavier pollutant gas stream. See FIG. 1 and FIG. 2A, Item72. Further more, it was discovered that machining the sides of the eight, ⅜"×⅝" slots at the smaller end of the vortex tube to a 30 degree 'tilt' angle to the vertical axis, with the 'tilt' conforming towards the outlet pipe 72, will improve the separation efficiency of the heavier pollutant (that is, the Argon) gas stream from the less heavy (Oxygen gas) stream. See FIG. 2B. This feature of the present invention is based on the advantage accruing from the principle of "stream-lined flow of gases." Thus, the 'tilt' angle machined to the slot's side exit edges allowed the separated, heavier Argon gases to emerge in a free flow out of the slots and collect smoothly in the delivery pipe72 for their transmittal to the Inert gas storage Tank: T.1. Hence, this feature of my present invention is one of the notable claims submitted.

A manually operated, two-way, ⅜"NPT brass ball valve is installed at the bottom of the second separation chamber (Item 68), in order to periodically remove any sediments accumulating in this chamber, from the airplane's Air conditioning system.

What is claimed is:

1. A method of separating gas components of the Compressed air diverted from the Aircraft engine's compressed air line to the Air Conditioning System, for subsequent re-cycling of the inert, non-combustible nitrogen and argon gas components into its hydrocarbon fuel tank's "ullage", thereby preventing Tank explosions generated by such installations;

and diverting the remaining, separated combustible oxygen gas component into the airplane/rocket engine's combustion air for increasing fuel economy of the engine, said method comprising:

effecting a first separation of the Air gas mixture into heavier, medium and lighter components, wherein the heavier and lighter components are primarily noncombustible, inert gases and the medium is combustible;

effecting a second separation in which the heavier and medium components are separated into a first portion comprising substantially of medium, combustible oxygen gas for egress to the oxygen storage tank; and a second portion comprised substantially of the heavier, non combustible, inert argon gas for egress to the inert nitrogen/argon gas storage tank;

providing means for periodical removal of the sedimentation collecting in chamber;

and mixing said second portion of said second separation stage (argon) gas with the lighter component (nitrogen) gas effected in the first separation stage, to effect a non-combustible mixture for inerting the "ullage" space in the airplane's fuel tank.

2. An apparatus for separating gas components of the air diverted from the Aircraft engine's compressed air line to the Air Conditioning System, for subsequent re-cycling of the inert, non-combustible nitrogen and argon gas components into its hydrocarbon fuel tank's "ullage" and other "OBGIS"areas, thereby preventing Tank explosions and suppression of cargo fires respectively, and diverting the remaining, separated combustible oxygen gas component into the airplane/rocket engine's combustion air for increasing the fuel economy of the engine, said method comprising:

an electrically driven, variable flow, adjustable discharge pressure Air Compressor(s) of either centrifugal or rotary screw type or similar, with each device or a plurality of devices, as may be required to fully energize these devices;

a first air gas separating device and means for bringing suitably, compressed air thereto from the said compressor, whereby the air is separated into its lighter and heavier primarily, inert, non-combustible components and substantially separated from its medium and primarily combustible components;

a second separating device and means for conducting said heavier and medium components thereto from the said first separating device;

said second separating device communicating with the atmosphere and having means to substantially separate the heavier non-combustible and medium combustible gases into a first portion comprising substantially of the medium, combustible oxygen gas for egress to the atmosphere; and a second portion comprised substantially of the heavier, incombustible argon gas for separate egress to the atmosphere;

means to feed the said lighter incombustible gases separated from the said first gas separating device and the heavier incombustible gases separated in the second portion of the second separating device, to an Inert gas storage tank, until required for inerting the "ullage" in the airplane's fuel tank or the "OBGIS" areas;

while said combustible oxygen gases of the first portion of the second separation device flow out from an open end of the second separation device, for storage into an Oxygenating Tank, until required for combustion efficiency improvements during "take-off" of the aircraft or rocket.

3. The apparatus as set forth in claim 2, where in said first gas separating device comprises:

an upstream stator, followed by a compressed air driven turbine and a conical vortex tube open at both ends and connected thereto at its larger end via a down stream stator, so as to receive the rotating gas discharge there from for separation therein into an inner gas core of said primarily incombustible lighter gases moving axially towards said turbine and an outer layer of said heavier gases moving axially in the opposite direction for;

separation in said second separating device into said primarily combustible and non-combustible gas and said means for conducting said lighter gases of said inner core from said conical vortex tube to an Inert gas storage tank, and means to provide a hollow shaft for support of said turbine communicating with said vortex tube at the inner core region thereof.

4. An apparatus as set forth in claim 2, wherein said first gas separating device comprises:

an upstream stator, followed by a compressed air driven turbine and a conical vortex tube, open at both ends and connected thereto at its larger end via a down stream stator, so as to receive the rotating gas discharge therefrom for separation there-in into an inner gas core of said primarily incombustible lighter gases moving axially towards said turbine and an outer layer of said heavier gases moving axially in the opposite direction for separation in said second separating device into said primarily combustible and non-combustible gases.

5. An apparatus as set forth in claim 2, said second separating device comprising:

a plurality of elongated, horizontal slots machined on the smaller end of the said vortex tube, so as to afford a streamlined egress of the outer layer of heavier, incombustible gases, into a gas collector chamber surrounding the said slotted area, whereby the outer layer of heavier gases passing through said vortex tube exit there from through said slotted area into said gas collector chamber;

means provided for return of the said heavier, incombustible gases to the Inert gas storage tank, while the medium weight, inner core of primarily combustible gas of said heavier outer layer, flow out from an open end of the second separation device, namely the vortex tube small end, for storage into an Oxygenating Tank.

6. The apparatus as set forth in claim 2, said second separating device comprising:

a plurality of elongated, horizontal machined slots on the smaller end of said vortex tube;

means provided for a gas collector chamber comprising a cylindrical shell, centrally mounted over said slots;

said gas collector chamber provided with a converging gas exit tube mounted peripherally and tangentially to the cylindrical shell of the gas collector chamber and centrally located over the said slots, whereby affording improved streamlined flow of the said outer convoluting layer of heavier gases, in to an Inert gas storage tank.

7. An apparatus as set forth in claim 2, said second separating device comprising:

a plurality of elongated, horizontal slots machined at an angle of 30 degrees to the vertical axis, on the smaller end of said vortex tube;

means provided for a gas collector chamber comprising a cylindrical shell centrally mounted over said slots;

and said gas collector chamber provided with a converging gas exit tube mounted peripherally and tangentially to the cylindrical shell of the gas collector chamber and located centrally over the said slots, in order to tangentially tilt the out flow of the said convoluting heavier gases, towards the gas collector chamber's exit tube;

whereby further streamlining and enhancing the said heavier gas flow in to the said Inert gas storage tank.

8. The apparatus as set forth in claim 2, said separating device comprising:

a plurality of elongated, horizontal slots machined at an angle of 30 degrees to the vertical axis, on the smaller end of the said vortex tube;

means provided for a gas collector chamber comprising a cylindrical shell, centrally mounted over said slots;

said gas collector chamber provided with a converging gas exit tube mounted peripherally and tangentially to the cylindrical shell of the gas collector chamber and located centrally over said slots;

means provided for the interior surfaces of the gas collector chamber and exit tube to be completely coated with a friction reducing, high temperature, abrasion resistant thermo-setting and organic industrial coating;

thereby further improving the streamlined and smooth, out-flow of the said outer layer of heavier gases, to the Inert gas storage tank.

9. The apparatus as set forth in claim 2, including an aircraft jet/rocket engine where in the compressed air supply to its Air Conditioned system is at 90~150 pounds per square inch or higher pressure, in combination therewith and having an engine or other water cooling supply and comprising:

a bearing support means for said turbine;

means for conducting cooling fluid from said radiator to said bearing support means;

means for the return of cooling fluid to said radiator, after the cooling of said bearing support means;

whereby reducing the bearing working temperature and achieving higher System turbine speeds, resulting in the improved separation and storage of the said lighter, medium and heavier constituent gases of air, for feeding the Inert gas and Oxygenating storage tanks of this Invention.

10. An apparatus for separation of the gas components of the air diverted from the Aircraft engine's air-intake line, for subsequent re-cycling of the inert, non-combustible nitrogen and argon gas components into its hydrocarbon fuel tank's "ullage", and "OBGIS" areas, thereby preventing Tank explosions and suppression of cargo fires, and diverting the combustible oxygen gas component into the airplane/rocket engine's combustion air, for increasing the fuel economy of the engine and passenger breathing comfort, said apparatus comprising:

a rotational device and means for feeding a portion of an aircraft engine's combustion in-take air, at pre-adjustable pressure thereto, to be rotated thereby to effect a rotational directional speed of air passing there-through, significantly greater than the speed of the intake air fed to the said device;

a vortex tube connected to said rotational device for receiving rotating air from the engine air intake, there-from to be stratified therein into a heavier outer layer of mixed non-combustible and combustible gases and a lighter inner core of primarily non-combustible gases;

means for feeding said inner core gases to said installation's Inert gas storage tank, for subsequent flow into the fuel tank "ullage" for preventing its explosions and "OBGIS" supplies;

means for separating said heavier outer layer into substantially heavier non-combustible gases and medium weight combustible gases, which egress through the open end of vortex cone, into said intallation's Oxygenating storage tank;

means comprising a horizontal, elongated slotted area of vortex tube, through which area said heavier non-combustible gases, leave said vortex tube for feed into the said installation's Inert gas storage tank;

means provided for removal of the heavier sedimentation particles collecting in said gas collector chamber surrounding the slotted area of vortex tube.

11. The apparatus as set forth in claim 10, wherein said vortex tube is tapered to increase the rotational speed of the gases therein; the larger end thereof being connected to said rotational device and the smaller end being open for exhausting said combustible gases;

said horizontal, elongated slotted area being located adjacent to said smaller open end of vortex tube, benefits from the significantly increased air-constituent gases' convoluting speed as they approach the second separation stage at the said slotted area in the smaller end of the vortex tube;

there by, improving the separation amount of the heavier non-combustible gases and sedimentation particulates from the lighter combustible gases.

12. The apparatus as set forth in claim 10, including an electrically driven, variable flow, adjustable discharge pressure Air Compressor(s) of either centrifugal or rotary screw type or similar, with each device or a plurality of devices, as may be required to fully energize these devices, in combination with said apparatus and said rotational device being a turbine connected thereto for tangential compressed air feed thereto and axial flow there from to said vortex tube and said rotational device connected thereto, to be driven by the aircraft engine's combustion air-intake thereof.

13. The apparatus as set forth in claim 10, including means provided for:

an automated valved communication of the inert gas flow lines for the lighter and heavier inert gases into an inert gas storage tank;

an automated valved communication of the combustible gas flowline into oxygen storage tank.

14. The apparatus as set forth in claim 10, including means provided for:

an automated valved communication of the inert gas flow line from the inert gas storage tank to the "ullage" volume in the fuel tank, for its complete inertness;

an automated controller responsive to the detection of a partial pressure of oxygen and the temperature within said "ullage" volume that is higher than a pre-determined, explosive level to cause inert gas to flow into the "ullage" from storage tank, to establish the oxygen partial pressure in the "ullage" volume to a safe and lower level.

15. The apparatus as set forth in claim 10, including means provided for:

an automated controller responsive to detection of a partial pressure of oxygen with in the airplane/aerospace rocket engine' combustion air supply or the passenger cabin, that is lower than a predetermined level to cause oxygen gas to flow in to either flow line, to re-establish the correct partial pressure for improved engine fuel economy, and/or the passenger's breathing comfort.

\* \* \* \* \*